INVENTORS
PAUL ABRAMSON
GEORGE R. STILWELL JR.
BY Ronald J. Kransdorf
ATTORNEY

United States Patent Office 3,440,607
Patented Apr. 22, 1969

3,440,607

CYCLICALLY SCANNED REMOTE ELEMENT OPERATING SYSTEM WITH ANSWER BACK

Paul Abramson, Yorktown Heights, and George R. Stilwell, Jr., West Nyack, N.Y., assignors to International Business Machines Corporation, New York, N.Y., a corporation of New York Filed Dec. 29, 1964, Ser. No. 421,885
Int. Cl. H04q 9/14
U.S. Cl. 340—163 11 Claims

ABSTRACT OF THE DISCLOSURE

A system for operating elements at a remote station from a central station which includes a contact at the central station for each of the elements to be operated. A corresponding gate is provided at the remote station for each of the elements to be operated. The contacts are cyclically scanned and a signal is applied to the remote station each time a closed contact is sensed, the signal conditioning all of the gates at the remote station. The latter gates are then cyclically scanned in synchronism with the scanning of the contacts at the central station and an element is operated each time the associated gate is conditioned when it is scanned. A contact is also provided at the remote station for each of the elements, and this contact is closed when the associated element is operated. The closing of the latter contact permits an answer-back signal to be sent to the central station, the receipt of which provides an indication that the element has been successfully operated.

This invention relates to a system for operating a plurality of elements positioned at a remote station from a central station, and for receiving back at the central station an indication that an element has been operated, and more particularly, to such a system which requires only a single pair of wires to interconnect the central station and the remote station.

In order to fully automate any operating system, a communications network must be provided which permits elements at various remote stations to be operated from a central station. Since, if an element should fail to operate when a signal is applied to it, the entire operation could be disrupted, it is generally desirable that an answer-back signal be generated at the remote station to indicate to the central station that the element has responded properly to the applied signal. In most applications of such systems, the number of elements involved is quite large so that any attempt to directly connect each element with the central station would result in an expensive and cumbersome maze of wires running throughout the operating site. Also, new elements are generally added to the system, old elements removed from the system, and elements in the system moved from one location to another after the system is initially installed. The difficulty and cost of installing new wiring interconnecting the central station with each such altered element in an existing operating facility detracts seriously from the feasibility of such a procedure. In order to reduce the number of interconnecting wires and to eliminate the need for installing new wiring each time a new element is added to the system or the location of an element altered, some form of multiplexing must be provided. However, when this is done, a problem arises of identifying what element a given signal from the central station is to be applied to. Heretofore, this problem has generally been solved by including an element-identifying code with the operating signal from the central station and having a device at each remote element which responds only when the proper operating code is applied to it. This scheme greatly increases both the cost and complexity of the system by requiring both code-generating devices at the central station and code-responsive devices at each of the remote elements. Also, since the line interconnecting the central station and the remote station must carry both location code and operating data, the amount of operating data, and therefore the system throughput, are substantially reduced.

It is therefore a primary object of this invention to provide an improved system for operating a plurality of remote elements from a central station, and for generating an answer-back signal which is applied to the central station to indicate the successful operating of the element.

A more specific object of this invention is to provide a system of the type described above which requires only a single pair of lines interconnecting the central station and the remote station.

Another object of this invention is to provide a system of the type described above which permits new elements to be added to the system and the location of elements in the system to be altered without requiring extensive rewiring.

A further object of this invention is to provide a system of the type described above which permits the operating signal to be applied to the proper element without requiring any additional information to be applied to the line.

A still further object of this invention is to provide a system of the type described above which is relatively simple, inexpensive, and reliable.

Still another object of this invention is to provide a system of the type described above which is affected by adverse environmental conditions.

In accordance with these objects, this invention provides a system for operating elements at a remote station from a central station which includes an indicating means, such as a contact, at the central station for each of the elements to be operated. The contact is, for example, closed when the associated element is to be operated. The contacts are sequentially scanned in a cyclic manner and a signal applied to the remote station each time a closed contact is scanned. A gate may be provided at the remote station for each of the elements to be operated, and the signal applied to the remote station used to condition all of these gates. These gates are then sequentially scanned in a cyclic manner in synchronism with the scanning of the contacts at the central station and an element operated each time its associated gate is conditioned when it is scanned. An indicating means, such as a contact, may also be provided at the remote station for each of the elements, and this contact closed when the associated element is operated. The closing of this contact permits an answer-back signal to be applied to the central station. The receiving of this answer-back signal at the central station at a time which is related in a predetermined manner to that at which the contact at the central station is scanned, serves to provide an indication that the element has been successfully operated.

The foregoing and other objects, features, and advantages of the invention will be apparent from the following more particular description of preferred embodiments of the invention, as illustrated in the accompanying drawings.

GENERAL DESCRIPTION OF FIGS. 1 AND 2

Figures 1, 1A:
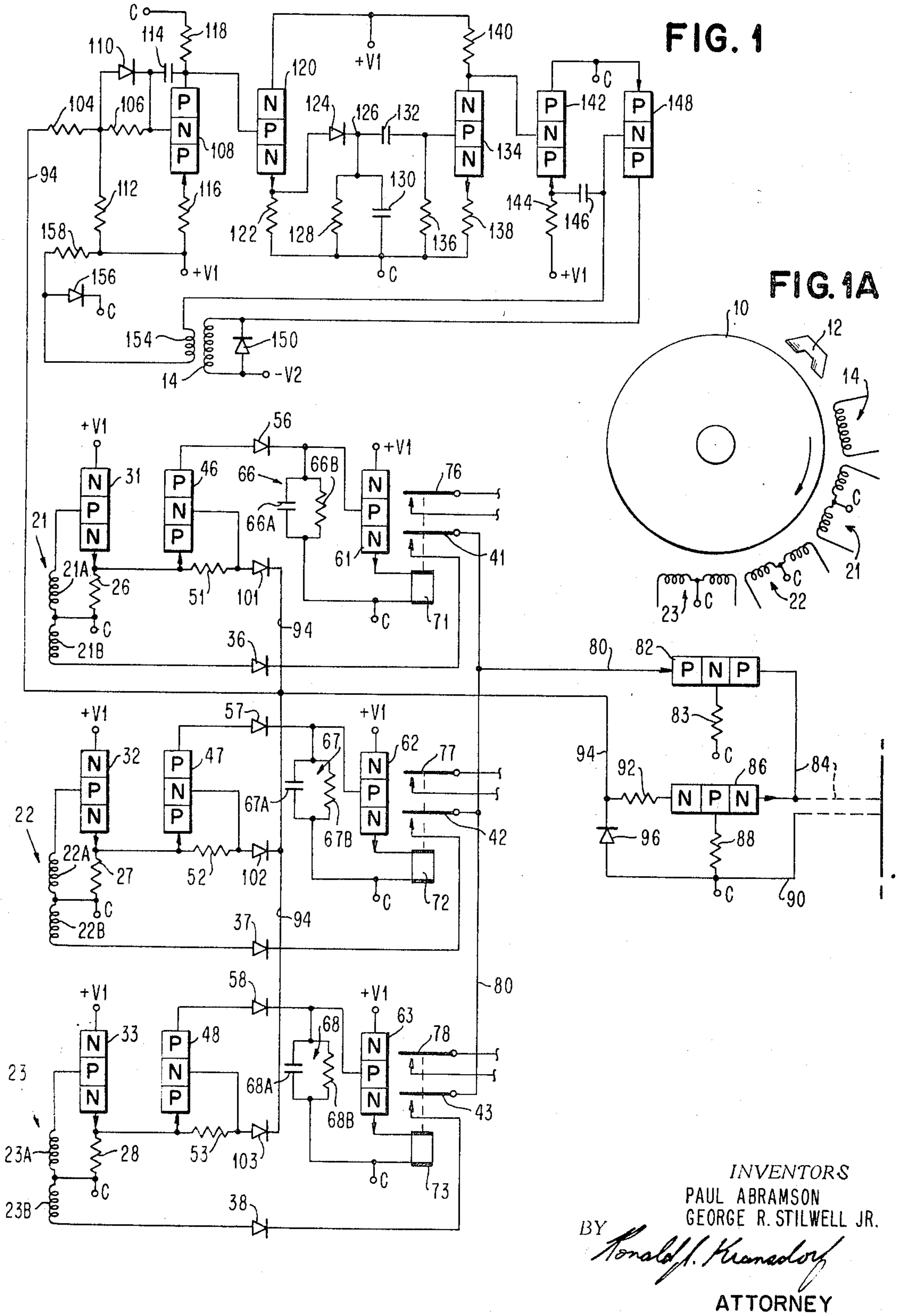
FIG. 1 is a schematic diagram of a remote station suitable for use with a first embodiment of the invention.
FIG. 1A is a schematic diagram of a pulse train generator suitable for use at the remote station shown in FIG. 1.

Referring first to FIG. 1A, it is seen that the pulse generator includes a rotating magnetic disc 10 having a permanent magnet erase head 12, a write coil 14, and a plurality of read coils, only three of which 21–23 are shown in the figure. Each of the read coils, which coils are shown in more detail in FIG. 1, is center-tapped so as to be divided into an upper portion designated A and a lower portion designated B. The center-tap of each of the read coils 21–23 is connected directly to a source of common potential C, which potential may, for example, be zero volts, and through a resistor 26–28 respectively, to the emitter of an NPN transistor 31–33. The upper terminal of each of the coils 21A–23A is connected to the base of the corresponding transistor 31–33 respectively, and the lower terminal of each of the coils 21B–23B is is connected through a diode 36–38 respectively to one terminal of a contact 41–43. The collector of each of the transistors 31–33 is connected to a source of positive potential +V1.

The emitters of each of the transistors 31–33 are connected directly to the emitter of a PNP transistor 46–48 respectively and through a resistor 51–53 to the base of the PNP transistor. The collectors of transistors 46–48 are connected through diodes 56–58 respectively to the bases of NPN transistors 61–63 and through RC networks 66–68 to source of common potential C. Each of the RC networks includes a capacitor, designated 66A–68A respectively, and a resistor, designated 66B–68B respectively. The collectors of transistors 61–63 are connected to the source of positive potential +V1 and the emitters of these transistors are connected through relay coils 71–73 respectively to ground. When a coil 71–73 is energized, the associated contact 41–43 is closed and an additional contact 76–78 respectively is also closed. The contacts 76–78 may be connected to operate any desired element.

The other terminal of contacts 41–43 is connected through line 80 to the emitter of PNP transistor 82. The base of transistor 82 is connected through resistor 83 to ground. The collector of transistor 82 is connected to the signal line 84 of the two-wire transmission line interconnecting the central station and the remote station. Signal line 84 is also connected to the emitter of NPN transistor 86. The base of transistor 86 is connected through resistor 88 to common line 90 of the two-wire transmission line interconnecting the central and remote stations. The collector of transistor 86 is connected through resistor 92 to line 94. Line 94 is connected through diode 96 to ground. Line 94 is also connected through diodes 101–103 respectively to the bases of transistors 46–48 and through resistors 104 and 106 to the base PNP transistor 108. Resistor 106 is shunted by diode 110, and one of its terminals is connected through resistor 112 to a source of positive potential +V1. The base and collector of transistor 108 are interconnected through capacitor 114. The emitter of transistor 108 is connected through resistor 116 to source of positive potential +V1 and the collector of transistor 108 is connected through resistor 118 to source of common potential C. The collector of transistor 108 is also connected to the base of NPN transistor 120. The collector of transistor 120 is connected to source of positive potential +V1 and the emitter of this transistor is connected through resistor 122 to source of common potential C. The emitter of transistor 120 is also connected through diode 124 to junction 126. Junction 126 is connected to source of common potential C through a parallel network which includes resistor 128 and capacitor 130. Junction 126 is also connected through capacitor 132 to the base of transistor 134. The base of transistor 134 is connected through resistor 136 to source of common potential C and the emitter of this transistor is connected through resistor 138 to source of common potential C. The collector of transistor 134 is connected through resistor 140 to source of positive potential +V1. The collector of transistor 134 is also connected to the base of transistor 142. The emitter of transistor 142 is connected through resistor 144 to source of positive potential +V1 and through capacitor 146 to the base of transistor 148. The collector of transistor 142 and the emitter of transistor 148 are connected to source of common potential C. The collector of transistor 148 is connected through write coil 14 to source of negative potential −V2 where V2 is slightly greater than V1. Diode 150 is connected across write coil 14. Feed-back coil 154 is magnetically coupled to write coil 14. One terminal of feed-back coil 154 is connected to the base of transistor 148 and the other terminal of this coil is connected through diode 156 to source of common potential C and through resistor 158 to source of positive potential +V1.

Figures 2, 2A:
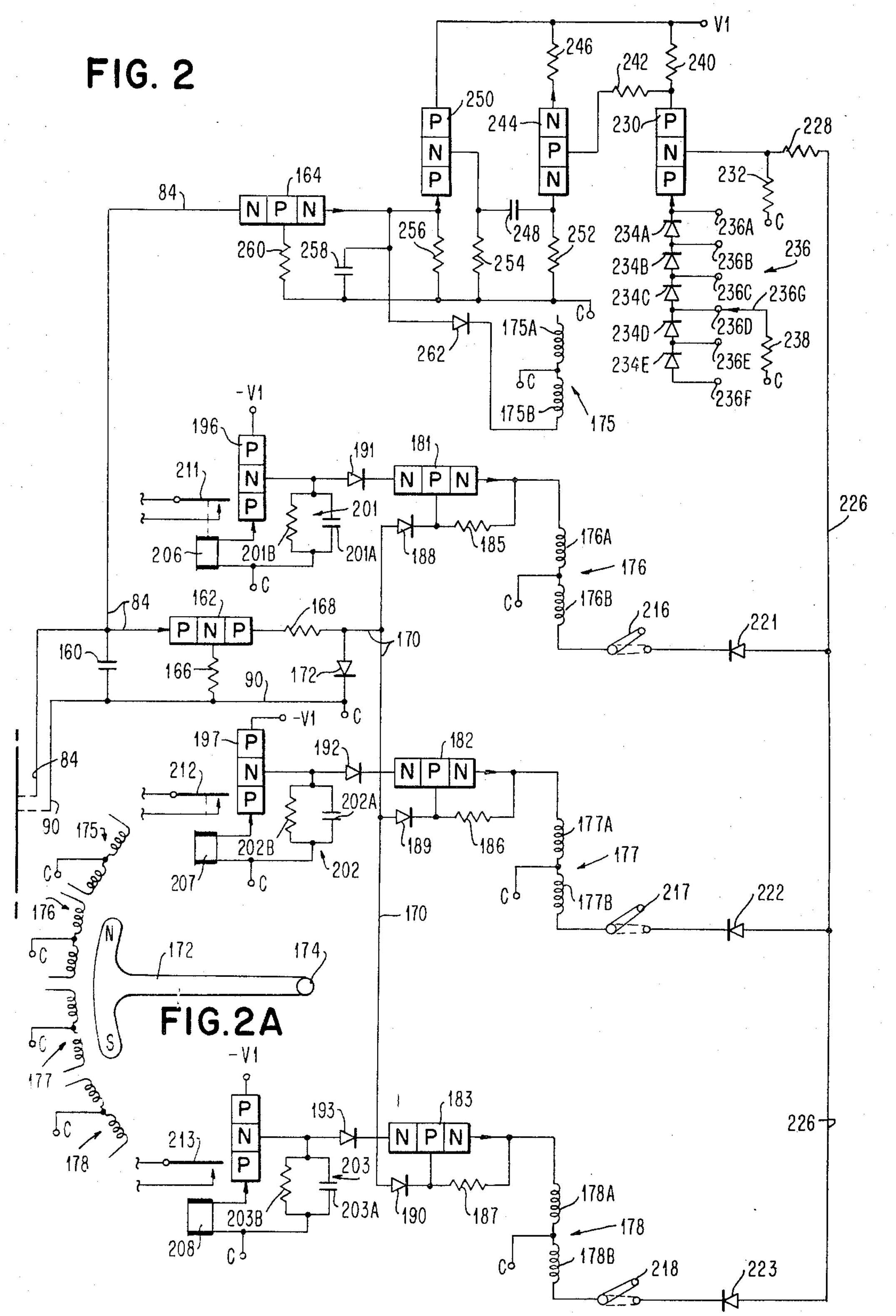
FIG. 2 is a schematic diagram of a central station suitable for use with the first embodiment of the invention.
FIG. 2A is a schematic diagram of a pulse train generator suitable for use at the central station shown in FIG. 2.

Referring now to FIG. 2, it is seen that capacitor 160 is connected across lines 84 and 90. Data line 84 is connected to the emitter of PNP transistor 162 and to the collector of NPN transistor 164. The base of transistor 162 is connected through resistor 166 to common line 90 and the collector of this transistor is connected through resistor 168 to line 170. Line 170 is connected to common potential C through diode 172.

Referring now to FIG. 2A, it is seen that the central station includes a permanent magnet 172 which rotates in a counterclockwise direction about hub 174. As magnet 172 rotates, it passes a synchronizing coil 175 and a plurality of other coils, only three of which 176–178 are shown in FIG. 2A. There is a coil 176–178 at the central station for each read coil 21–23 (FIG. 1) at the remote station. Each of the coils 176–178, which coils are shown in more detail in FIG. 2, is center-tapped to source of common potential C, dividing the coil into an upper portion designated the A portion and the lower portion designated the B portion.

The upper terminal of each of the coils 176A–178A is connected directly to the emitter of an NPN transistor 181–183 respectively and through a resistor 185–187 to the base of the NPN transistor. The base of each of the transistors 181–183 is also connected through a diode 188–190 to line 170. The collectors of transistors 181–183 are connected through diodes 191–193 respectively to the bases of PNP transistors 196–198. The bases of transistors 196–198 are connected through RC networks 201–203 respectively to ground. The RC networks each includes a capacitor 201A–203A and a resistor 201B–203B. The collectors of each of the transistors 196–198 are connected to a source of negative potential −V1, and the emitters of these transistors are connected through relay coils 206–208 respectively to source of common potential C. When a coil 206–208 is energized, a contact 211–213 respectively associated with it is closed. The contacts 211–213 may be connected to, for example, light a lamp when current is applied to their respective operating coils 206–208.

The lower terminals of the coils 176B–178B are connected through switches 216–218 and diodes 221–223 respectively to line 226. Switches 216–218 have, for ease of illustration, been shown as being manually operated.

However, these switches may in fact be electronic and be operated under computer control.

Line 226 is connected through resistor 228 to the base of PNP transistor 230. The base of transistor 230 is also connected through resistor 232 to source of common potential C. A plurality of diodes 234A–234E are connected in series with the emitter of transistor 230. A terminal 236A of multi-contact switch 236 is also connected to the emitter of transistor 230 with the remaining terminals of this switch being connected to the junctions of the diodes 234A–234E. These diodes serve as constant voltage drops for reasons which will be described later. The wiper contact 236G of switch 236 is connected through resistor 238 to source of common potential C. The collector of transistor 230 is connected through resistor 240 to source of negative potential —V1 and through resistor 242 to the base of transistor 244. The emitter of transistor 244 is connected through resistor 246 to source of negative potential —V1 and the collector of this transistor is connected through capacitor 248 to the base of PNP transistor 250. The emitter of transistor 244 and the base of transistor 250 are connected through resistors 252 and 254 respectively to source of common potential C. The collector of transistor 250 is connected to source of negative potential —V1. The emitter of transistor 250 is connected to the emitter of transistor 164 and through resistor 256 or capacitor 258 to source of common potential C. The base of transistor 164 is connected through resistor 260 to source of common potential C. The emitters of transistors 164 and 250 are also connected through diode 262 to the lower terminal of synchronizing coil 175B.

OPERATION OF EMBODIMENT OF INVENTION SHOWN IN FIGS. 1 AND 2

Referring first to FIG. 2A, it is seen that as magnet 172 rotates past coils 175–178, pulses are generated in each of these coils. The pulses which are generated in coils 175A and 175B are shown on lines A and B respectively of FIG. 3. Similarly, the pulses generated in coils 176A and 176B are shown on lines C and D respectively of FIG. 3; the pulses induced in coils 177A and 177B on lines E and F respectively of FIG. 3; and the pulses generated in coils 178A and 178B on lines G and H respectively of FIG. 3. The negative half cycle of the pulse generated in coil 175B is applied through diode 262 (FIG. 2) and transistor 164 to data line 84. Capacitor 258 functions to reshape the pulse generated in coil 175B so that it has the shape of the first pulse shown on line I of FIG. 3.

The negative pulse on line 84 is applied through transistor 86 (FIG. 1), resistor 92, and line 94 to an integrating circuit which includes transistor 108, diode 110, capacitor 114, and resistors 104, 106, 112, 116, and 118. It should be noted that the negative pulse applied to line 94 is also applied through diodes 101–103 to the base of transistors 46–48. However, as may be seen from lines L through Q of FIG. 3, no signals are being induced in coils 21–23 at this time, and the signals applied to transistors 46–48 therefore have no effect. The output pulse from transistor 108 is shown on line J of FIG. 3. This pulse is applied through emitter-follower transistor 120 and diode 124 to charge capacitor 130. Capacitor 130 discharges very slowly through resistor 128 to source of common potential C so that the charge pattern across the capacitor is of the form shown on line K of FIG. 3. This potential appears at point 126 in the circuit.

Capacitor 132 differentiates the charge across capacitor 130 and therefore applies a positive pulse to the base of transistor 134 each time capacitor 130 is charged. The positive pulse applied to transistor 134 is amplified and inverted in this transistor and applied through emitter-follower transistor 142 to the base of transistor 148. The negative pulse applied to the base of PNP transistor 148 forward-biases this transistor, permitting the negative potential —V2 to flow through write coil 14 and transistor 148 to source of common potential C. A write signal is therefore generated in coil 14. The signal flowing through coil 14 induces a positive feed-back signal in coil 154 which is applied to maintain transistor 148 conductive. When a steady state condition is reached, the induced signal in coil 154 ceases and transistor 148 is cut off, thereby terminating the write pulse. Transistor 148 and coil 154 therefore function as a blocking oscillator. The wide pulse applied through data line 84 to the remote station therefore causes a spot to be recorded in disc 10 (FIG. 1A) by write coil 14.

Figure 3:
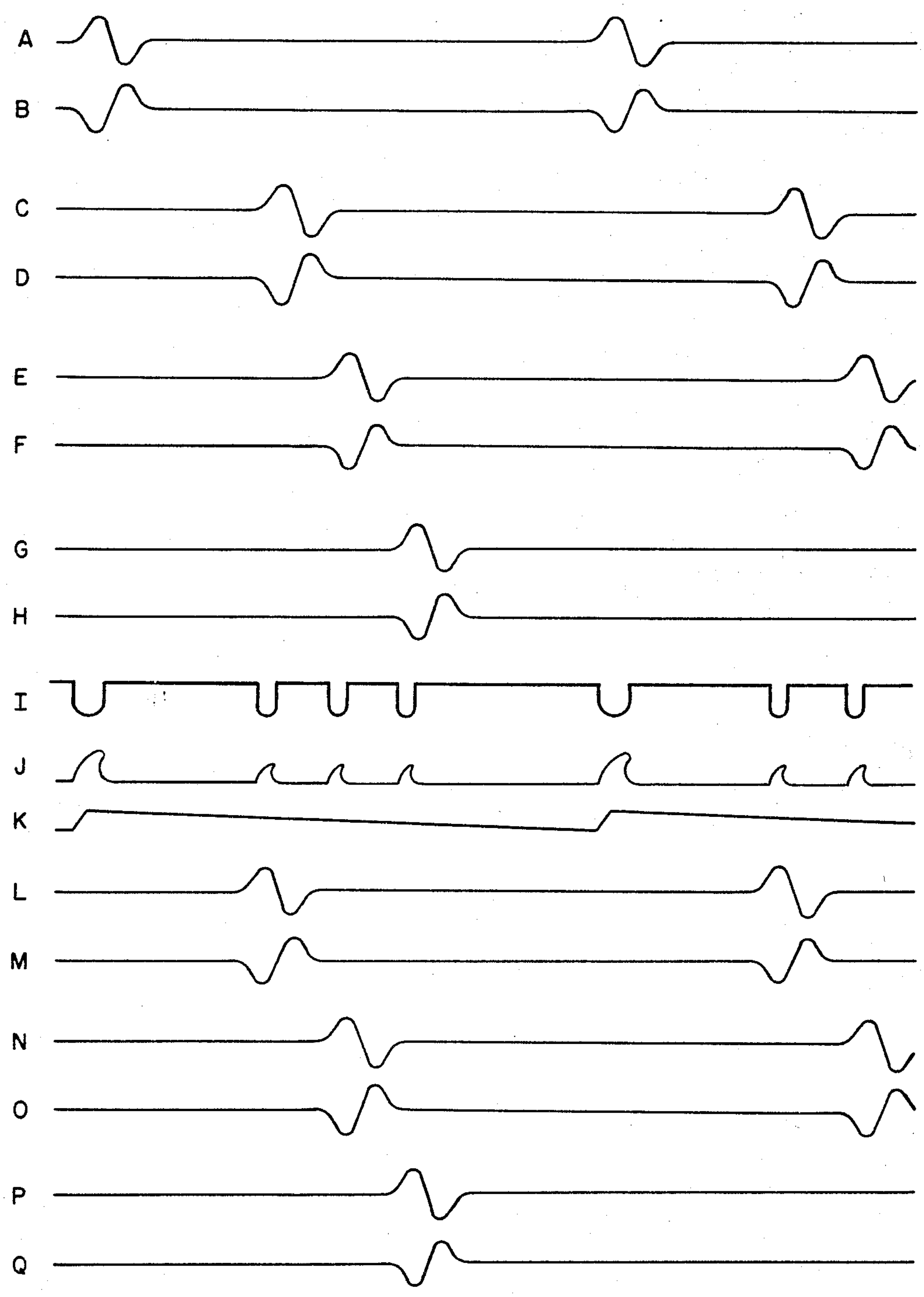
FIG. 3 is a diagram illustrating the pulses appearing at the various points in the circuits of FIGS. 1 and 2.

Magnet 172 (FIG. 2A) passes from being adjacent to coil 175 to being adjacent to coil 176. When magnet 172 is adjacent to coil 176, wave shapes of the type shown on lines C and D of FIG. 3 are generated in coils 176A and 176B respectively. If, at this time, switch 216 is opened, nothing happens. If, on the other hand, switch 216 is closed, indicating that it is desired to operate the element (not shown) associated with contact 76 (FIG. 1), the negative half cycle of the wave shape generated in coil 176B is applied through contact 216, diode 221, and line 226 to the base of transistor 230.

From line D of FIG. 3, it can be seen that it is the first half of the bi-polar pulse generated in coil 176B which is applied to transistor 230. Transistor 230 performs three functions. First, it amplifies the pulse applied to it, and second, it inverts this pulse. Third, it enables the circuit to control the time at which the data pulses appearing on line 84, which pulses are shown on line I of FIG. 3, occur. If wiper arm 236G is in contact with terminal 236A, then a near common potential is applied to the emitter of transistor 230 and it becomes conductive as soon as line 226 becomes slightly negative. If arm 236G is contacting one of the other terminals of switch 236, a potential drop of about three-tenths of a volt for each of the diodes 234 is introduced between source of common potential C and the emitter of transistor 230. A variable negative potential may therefore be applied to the base of transistor 230, causing it to conduct at a later point of the input pulse.

The output pulse from transistor 230 is applied to turn on transistor 244. The output from transistor 244 is a square wave, the starting point of which depends on the setting of switch 236. Capacitor 248 converts this square wave into a negative spike at the leading edge of the pulse and a positive spike at the trailing edge. These pulse spikes are applied to emitter-follower transistor 250 which passes only the negative spike to transistor 164. This spike is shaped somewhat by filter capacitor 258 to give an output pulse of the type shown on line I of FIG. 3. The time at which pulse occurs is dependent on the setting of switch 236, and the width of this pulse is about half of that of the pulse originally generated in coil 176B. The width of the data pulse applied to output transistor 164 is therefore about half of that of the synchronizing pulse which was applied to this transistor by coil 175B.

The data pulse is applied through transistor 164, data line 84, and transistor 86 (FIG. 1) to line 94. As before, the negative pulse applied to line 94 is differentiated in transistor 108 and applied to charge capacitor 130. However, as may be seen from line J of FIG. 3, the amplitude of this differentiated pulse is less than the charge already on the capacitor at this time, and this pulse is therefore without effect on the synchronizing circuit.

The negative pulse applied to line 94 is also applied through diode 101 to the base of transistor 46. As may be seen from line L of FIG. 3, the positive peak of the first half of the bi-polar pulse generated in coil 21*a* by the spot on disc 10 passing coil 21 occurs at the same time that the negative pulse is being applied to the base of transistor 46. This positive pulse is applied through amplifying emitter-follower 31 and now-conducting transistor 46 to charge capacitor 66A. As capacitor 66A charges, it builds up a DC level at the base of transistor 61 which ultimately causes this transistor to conduct. When transistor 61 conducts, a singal flows from the source of +V1 potential through transistor 61 and coil 71 to source of common potential C. The signal flowing through coil 71 energizes contacts 41 and 76. The RC constant of network 66 is such that capacitor 66A maintains a sufficient charge to keep transistor 61 conductive for two complete cycles of the system. Therefore, as long as contact 216 remains closed, a signal flows through coil 71 maintaining contacts 41 and 76 closed. If, for some reason, such as noise or other transient malfunction, a single energizing pulse fails to get through, capacitor 66A maintains contacts 41 and 76 closed for an additional cycle. The operation of the element (not shown) controlled by contact 76 is therefore not interrupted by noise on the line or other similar transient conditions.

The positive half of the bi-polar pulse generated in coil 21B which, from line M of FIG. 3, is seen to be the second half of this pulse, is applied through diode 36, now closed contact 41, and line 80 to the emitter of transistor 82. This pulse passes through transistor 82, data line 84, transistor 162 (FIG. 2), resistor 168, line 170, and diode 188 to the base of transistor 181. As may be seen from lines D and M of FIG. 3, this positive half cycle occurs slightly before the negative half cycle of the bi-polar pulse generated in coil 176A. However, the relative time of occurrence of these two pulses is adjusted so that the delay in transmission line 84 is sufficient to cause the conditioning pulse to be applied to the base of transistor 181 simultaneously with the generating of the negative half cycle of the bi-polar pulse in coil 176A. The pulse in coil 176A is therefore enabled to pass through transistor 181 and diode 191 to charge capacitor 201A. As capacitor 201A charges, a DC potential level is built up at the base of transistor 196 which ultimately causes this transistor to conduct. This provides a signal path from source of negative potential −V1 through transistor 196 and coil 206 to source of common potential C. The current flowing through coil 206 causes contact 211 to be closed. This coil may be caused to energize other contacts besides contact 211 if desired, and an indicating element (not shown) may be connected to be operated when contact 211 is closed. As with capacitor 66A (FIG. 1) the charge on capacitor 201A decays at a fairly slow rate through resistor 201B so that contact 211 is opened only if no conditioning pulse is applied to the base of transistor 181 for two succeeding cycles of the system. As before, this prevents noise or other similar transient conditions from causing a false indication to be generated.

Switches 217 and 218 operate in an identical manner to control the operation of contacts 42 and 77 and 43 and 78 respectively. Answer-back signals are generated by the elements controlled by coils 22 and 23 in a manner identical to that described above for the element controlled by coil 21 to control the contacts 212 and 213 respectively. Since the circuit operates in a cyclic manner, a switch 216–218 may be opened or closed anytime a decision is made as to the operating of the element controlled thereby and the desired operation is performed during the next cycle of the system. Since, in a preferred embodiment of this invention, magnet 172 rotates at about 60 cycles per second, a near instantaneous indication is received at the central station as to whether an indicated element at the remote station has been operated.

From the above, it can be seen that, depending on its length, data line 84 delays both the energizing and the answer-back signal applied to it by a predetermined amount. The delay of the energizing pulses is compensated for by the fact that the wide synchronizing pulse (line I of FIG. 3) used to record a spot on magnetic disc 10 (FIG. 1A) is delayed by the same amount in line 84 as the energizing pulses following it. The delay in line 84 of the answer-back signals is compensated for by the fact that the signals induced in coils 21A–23A (FIG. 1 and lines L, N, and P of FIG. 3) occur before the corresponding signals induced in coils 176A–178A (FIG. 2 and lines C, E, and G of FIG. 3). The amount of this difference is equal to the delay in line 84. Since the time at which the pulses induced in lines 21A–23A occur is adjusted so that the peak of the first half of the pulse induced in each of these coils occurs simultaneously with the arrival of the corresponding energizing pulse from the central station, and the time at which these pulses are generated is controlled by switch 236 (FIG. 2), the delay in line 84 of the answer-back signals is compensated for by adjusting switch 236 and then moving read heads 21–23 to cause the pulses induced therein to occur at the proper time.

GENERAL DESCRIPTION OF EMBODIMENT OF THE INVENTION SHOWN IN FIGS. 4 AND 5

Figures 4, 4A:
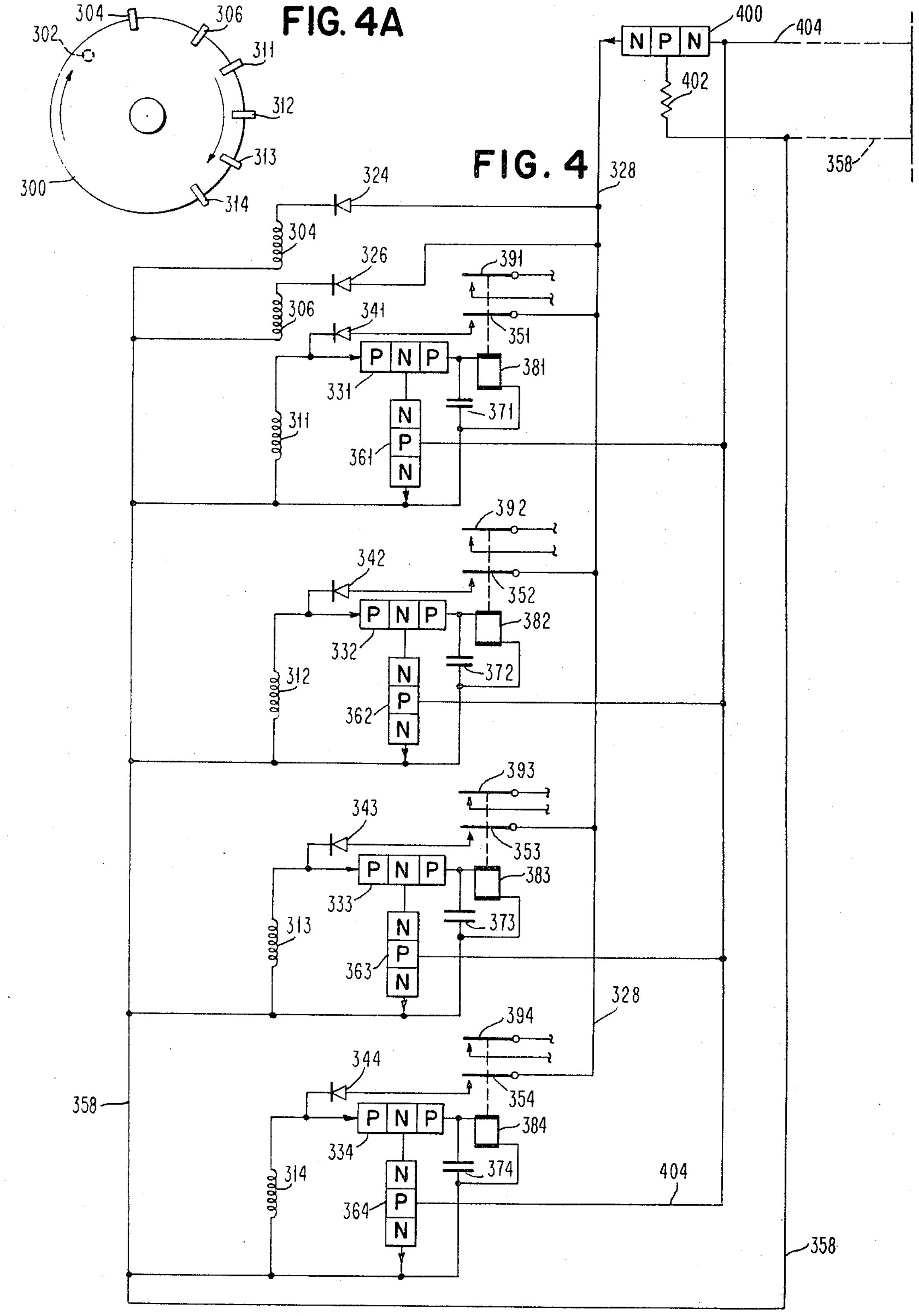
FIG. 4 is a schematic diagram of a remote station suitable for use with a second embodiment of the invention.
FIG. 4A is a schematic diagram of a pulse train generator suitable for use at the remote station shown in FIG. 4.

Referring now to FIG. 4A, it is seen that at the remote station of the second embodiment of the invention there is a rotating disc 300 having a magnetic spot 302 permanently recorded thereon. Magnetic spot 302 rotates past synchronizing read coils 304 and 306 and a plurality of element-energizing read coils, only four of which, 311–314, are shown in the figure. The spacing between coils 304 and 306 is one and one-half that between the other read coils positioned around disc 300. The reason for this will be apparent later. Referring now to FIG. 4, it is seen that one terminal of coils 304 and 306 is connected through diodes 324 and 326 respectively to line 328. One terminal of coils 311–314 is connected to the emitter of PNP transistor 331–334 respectively and through diodes 341–344 and contacts 351–354 respectively to line 328. The other terminal of each of the coils 304, 306, and 311–314 is connected to common line 358 of the two-wire transmission line interconnecting the central and remote stations. The bases of transistors 331–334 are connected to the collectors of NPN transistors 361–364 respectively. The emitters of transistors 361–364 are connected to common line 358. The collectors of transistors 331–334 are connected through a parallel network made up of capacitors 371–374 and relay coils 381–384 respectively to common line 358. Coils 381–384 are connected such that when a signal is applied to them, contacts 351–354 and 391–394 respectively are closed. The elements to be operated are connected in series with the contacts 391–394.

Line 328 is connected to the emitter of NPN transistor 400. The base of transistor 400 is connected through resistor 402 to common line 358. The collector of transistor 400 is connected to data line 404 of the two-wire transmission line interconnecting the remote station and the central station. Line 404 is also connected to the bases of transistors 361–364.

Figures 5, 5A:
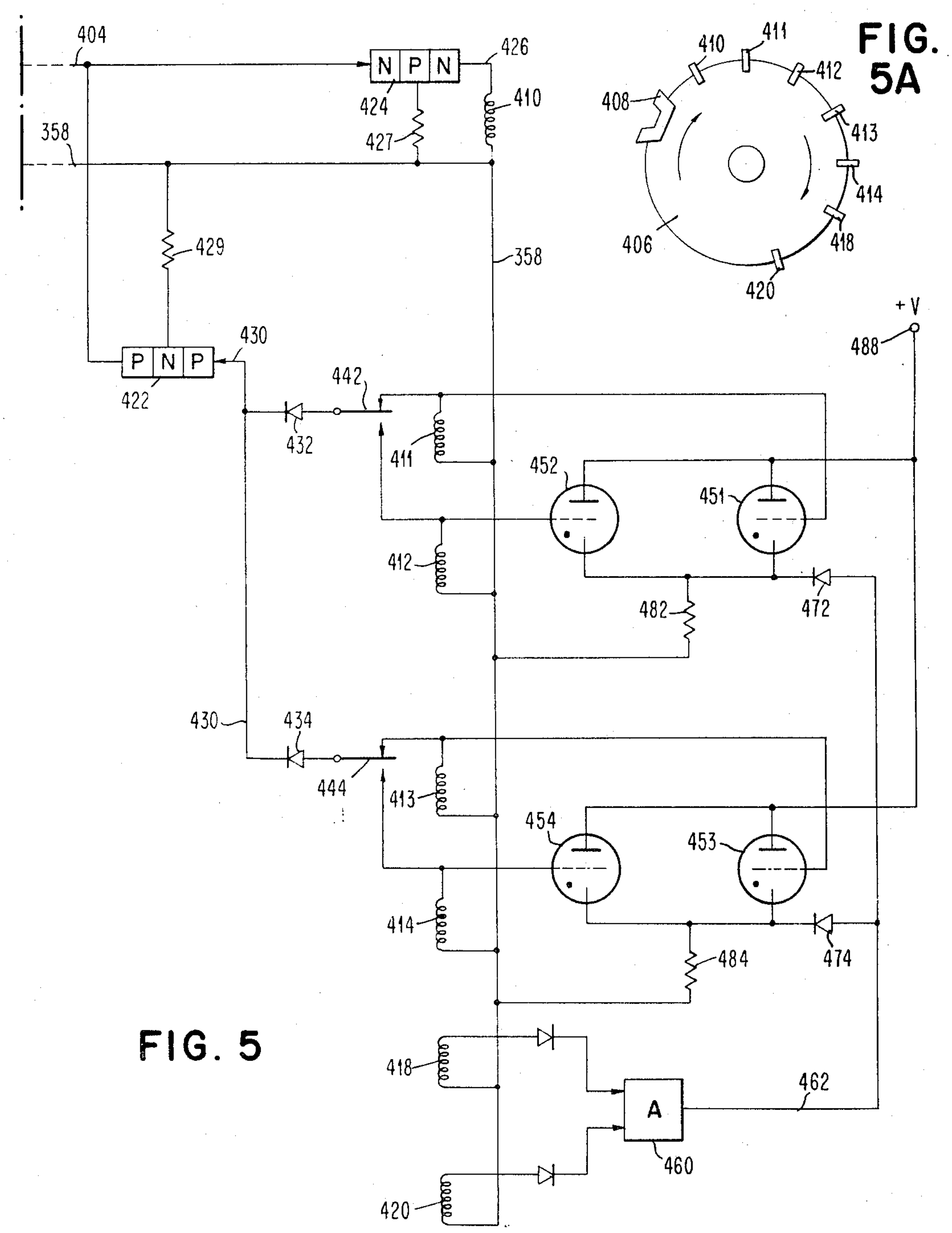
FIG. 5 is a schematic diagram of a central station suitable for use with the second embodiment of the invention.
FIG. 5A is a schematic diagram of a pulse train generator suitable for use with the central station shown in FIG. 5.

Referring now to the FIG. 5A, it is seen that the central station also has a rotating magnetic disc 406. Positioned around its periphery, magnetic disc 406 has an erase head 408, a write head 410, a plurality of energizing read coils, only four of which, 411–414, are shown in the figure, and two synchronizing read coils 418 and 420. The spacing between read coils 418 and 420 is one and one-half that between the other read coils. Line 404 is connected through transistor 424 (FIG. 5) and line 426 to energize write head 410. The base of transistor 424 is connected to common line 358 through resistor 427. Line 404 is also connected to the collector of PNP transistor 422. The base of transistor 422 is connected to common line 358 through resistor 429 and the emitter of transistor 422 is connected through line 430, and a plurality of diodes (only two of which 432 and 434 are shown in the figure) to the arms of a plurality of two-way switches (only two of which 442 and 444 are shown in the figure). One of the terminals of switches 442 and 444 is connected to one terminal of read coils 411 and 413 respectively and to the control grids of thyratrons 451 and 453. The other terminals of switches 442 and 444 are connected to one terminal of coils 412 and 414 respectively and to the control grids of thyratrons 452 and 454. One terminal of synchronizing coils 418 and 420 is connected to the inputs of AND gate 460. Output line 462 from AND gate 460 is connected through diode 472 to the cathodes of thyratrons 451 and 452 and through diode 474 to the cathodes of thyratrons 453 and 454. The cathodes of thyratrons 451 and 452 are also connected through resistor 482 to ground and the cathodes of thyratrons 453 and 454 are connected through resistor 484 to common line 358. The plates of thyratrons 451–454 are connected to a source of positive potential 488.

OPERATION OF EMBODIMENT OF THE INVENTION SHOWN IN FIGS. 4 AND 5

In operation, magnetic spot 302 (FIG. 4A) on disc 300 at the remote station rotates past coils 304, 306, and 311–314. As the spot passes coil 304, a bi-polar pulse of the type, for example, shown on line A of FIG. 3, is generated in this coil. The negative half cycle of this pulse is passed through diode 324 (FIG. 4), line 328, transistor 400, data line 404, transistor 424, and line 426 to write head 410 (FIG. 5A) causing a spot to be recorded on magnetic disc 406 at the central station. Similarly, as magnetic spot 302 passes coil 306, write head 410 is again energized to cause a spot to be recorded on disc 406. Since the spacing between coils 304 and 306 is one and one-half that between any other two heads around disc 300, the spacing between the spots recorded on disc 406 as a result of coils 304 and 306 being energized, is one and one-half that between any other two spots which may be recorded on disc 406.

The head spacing is such around discs 300 and 406 that as magnetic spot 302 comes adjacent to coil 311, the first spot recorded on disc 406 as a result of coil 304 being energized comes adjacent to coil 411. If switch 442 is at this time in the position shown in FIG. 5, the positive half cycle of the bi-polar pulse generated in coil 411 as a result of the spot on disc 406 passing it, which half cycle is the first half cycle of this pulse, passes through switch 442, diode 432, transistor 422, and data line 404, to the base of transistor 361, rendering this transistor conductive. Transistor 361 being conductive causes transistor 331 to be conductive, permitting the positive half cycle of the pulse generated in coil 311 as a result of spot 302 on disc 300 passing it to pass through transistor 331 to charge capacitor 371. As the charge across capacitor 371 builds up, coil 381 is energized, causing contacts 351 and 391 to be closed. The decay time for the charge across capacitor 371 is long enough so that coil 381 remains energized for two cycles of the system. Capacitors 371–374 therefore perform the same function as capacitors 66A–68A in FIG. 1.

The closing of contact 391 causes the element being controlled to be operated in a desired fashion. For the embodiment of the invention shown in FIGS. 4 and 5, it is assumed, for example, that the closing of contact 391 causes a particular element to be energized, that the element remains energized only so long as contact 391 remains closed, and that the closing of contact 392 causes the same element to be deenergized. Therefore, if switch 442 is in the position shown in FIG. 5, the element (not shown) is energized.

The closing of contact 351 permits the negative half cycle of the pulse generated in coil 311 to pass through diode 341, now closed contact 351, line 328, transistor 400, line 404, transistor 424, and line 426 to cause a spot to be recorded on disc 406. A spot is therefore recorded on disc 406 each time a successful contact closure is effected. As spot 302 moves past coils 312–314 and the spot recorded on disc 406 as a result of spot 302 passing coil 304, moves past coils 412–414, selected ones of the contacts 352–354 and 392–394 are energized in a manner identical to that described above for contacts 351 and 391. Due to the manner in which switches 442 and 444 are arranged, only half of the contacts at the remote station may be energized during any given cycle of operation. With the switches set as shown in FIG. 5, contacts 351 (FIG. 4), 353, 391, and 393 are closed, and the other contacts at the remote station remain open.

It should be noted that as the spot recorded on disc 406 as a result of spot 302 passing read head 306 and as the spots recorded on disc 406 as a result of answer-back signals being generated at the remote station pass read coils 411–414, signals are generated in these coils. However, these signals occur out of synchronism with (i.e., midway between) the signals generated in coils 311–314 at the remote station and are therefore ineffective to operate any elements.

When the spot recorded on disc 406 (FIG. 5) as a result of spot 302 on disc 300 passing coil 304 reaches a point adjacent to coil 420, the spot recorded on disc 406 as a result of spot 302 passing coil 306 is adjacent to coil 418. Due to the unique spacing between heads 418 and 420, spots can be adjacent to both these coils only once during any operating cycle of the system. At this same time, a spot generated on disc 406 as a result of one of the contacts 351–354 being closed is adjacent to a coil 411–414 respectively. The simultaneous generation of signals in coils 418 and 420 causes AND gate 460 to be fully conditioned to generate an output signal on line 462 which is applied to the cathodes of thyratrons 451–454 to extinguish all of these thyratrons. The negative half cycles of the pulses induced in such of the coils 411–414 as have spots adjacent to them at this time are then applied to the control grids of corresponding thyratrons 451–454 to fire these thyratrons. For example, with the switches 442 and 444 set as shown in FIG. 4, coils 411 and 413 have spots adjacent to them at this time causing thyratrons 451 and 453 to be fired. The firing of the thyratrons gives a visual indication of the setting of the contacts at the remote station. Once a thyratron, for example thyratron 451, is set, the resulting potential drop across common cathode resistor 482 prevents the adjacent thyratron 452 from being set until thyratron 451 is again extinguished.

In the preferred embodiments of the invention, synchronizing between the central and remote stations is achieved by using a detectable pulse at one of the stations to record a magnetic spot on a rotating disc at the other station and this spot is then used to generate the energizing pulses at the other station. However, where all operations are in the same plant, or in another relatively small area which is fed by a common A.C. power supply, the fact that a common power supply is being used to operate the motors at the central and remote stations may provide sufficient synchronization between these stations so that other synchronizing circuitry is not required. With such an arrangement, synchronous motors with a single lock-in-point are employed at both the central and remote station. With a 60 c.p.s. power supply, a polarized hysteresis synchronous motor turning at 3600 r.p.m. is suitble for use for this purpose. The motors rotate magnets past read coils of the type shown in FIGS. 1 and 2. Since the motors are turning at synchronous speed, the phase, or instantaneous position of the rotating magnet is directly controlled by the phase of the power supply. The pulses generated with this embodiment of the invention are utilized to achieve remote element control with answer-back in the same manner as these pulses were used with the embodiment of the invention shown in FIGS. 1 and 2. By adjusting the position of the magnet at, for example, the remote station relative to the shaft of its driving motor, the phase or time position of the pulses at the remote station may be brought into coincidence with the corresponding pulses at the central station. The time delay in the transmission line between the two stations may also be compensated for to some extent in this manner.

Also, while in the preferred embodiments of the invention described so far, only a single remote station has been shown and bi-polar pulses have been utilized, numerous such systems could be employed at a single facility to control elements at several remote stations from a single central station. Some sharing of equipment, such as motors and magnets, at the central station might be possible. The system could also be modified so that bi-polar pulses need not be utilized. It should also be noted that, while magnetic pulse generators and transistor logic circuits have been employed in the preferred embodiments of the invention, any suitable pulse generator as, for example, a battery in series with a rotating arm commutator, and any suitable type of logic circuitry may be employed.

What is claimed is:

1. A system for operating elements at a remote station from a central station and for receiving an answer-back signal at the central station each time an element is successfully operated comprising:

indicating means at said central station for each of said elements, the indicating means for an element being activated when the associated element is to be operated;

cyclic means for sequentially scanning said indicating means;

means responsive to an indicating means being activated when it is scanned for applying a signal to said remote station;

means responsive to said signal being received at said remote station at a time related in a predetermined manner to that at which said indicating means is scanned for operating said element;

means operative when said element has been operated for applying a signal to said central station; and means responsive to said signal being received at said central station at a time related in a predetermined manner to that at which said indicating means is scanned for indicating that said element has been operated.

2. A system for operating elements at a remote station from a central station and for receiving an answer-back signal at the central station each time an element is successfully operated comprising:

indicating means at said central station for each of said elements, the indicating means for an element being activated when the associated element is to be operated;

first cyclic means for sequentially scanning said indicating means;

a gating means at said remote station for each of said elements;

second cyclic means for sequentially scanning said gating means, said first and second cyclic means being synchronized with each other;

means responsive to an indicating means being activated when it is scanned for applying a signal to condition all of said gating means at said remote station;

means responsive to a gating means being conditioned when it is scanned to operating the associated element;

means operative when said element has been operated for applying a signal to said central station; and means responsive to said signal being received at said central station at a time related in a predetermined manner to that at which said indicating means is scanned for indicating that said element has been operated.

3. A system for operating elements at a remote station from a central station and for receiving an answer-back signal at the central station each time an element is successfully operated comprising:

first indicating means at said central station for each of said elements, the first indicating means for an element being activated when the associated element is to be operated;

cyclic means for sequentially scanning said first indicating means;

means responsive to a first indicating means being activated when it is scanned for applying a signal to said remote station;

second indicating means at said remote station for each of said elements;

means responsive to said signal being received at said remote station at a time related in a predetermined manner to that at which said first indicating means is scanned for operating said element and for activating the associated second indicating means;

means operative when said second indicating means has been activated for applying a signal to said central station; and means responsive to said signal being received at said central station at a time related in a predetermined manner to that which said first indicating means is scanned for indicating that said element has been operated.

4. A system for operating elements at a remote station from a central station and for receiving back an indication at the central station that the elements have been operated comprising:

means for generating pulses at the central station;

means for generating like pulses at the remote station, said pulses at said central station and said remote station being time related to each other;

means at said central station for indicating that an element at the remote station is to be operated;

means responsive to said indicating means for permitting a pulse at said central station to be applied to the remote station;

means responsive to said pulse from said central station for permitting the corresponding pulse at said remote station to operate said element;

means responsive to the operating of said element for permitting another pulse at said remote station to be applied to said central station; and means responsive to said other pulse from said remote station for permitting the corresponding pulse at said central station to be applied to give an indication at the central station of the operating of the remote element.

5. A system for operating elements at a remote station from a central station and for receiving an answer-back signal at the central station each time an element is successfully operated comprising:

indicating means at said central station for each of said elements, the indicating means for an element being activated when the associated element is to be operated;

first cyclic means for sequentially applying pulses to said indicating means;

a gating means at said remote station for each of said elements;

second cyclic means for sequentially applying pulses to said gating means, said first and second cyclic means being synchronized with each other;

means responsive to an indicating means being activated when a pulse is applied to it for passing the pulse to condition all of said gating means at said remote station;

means responsive to a gating means being conditioned when a pulse is applied to it for passing the pulse to operate said element;

means operative when said element has been operated for applying a pulse to said central station; and means responsive to said pulse being received at said central station at a time related in a predetermined manner to that at which a pulse is applied to said indicating means for indicating that said element has been operated.

6. A system for operating elements at a remote station from a central station and for receiving an answer-back signal at the central station each time an element is successfully operated comprising:

first indicating means at said central station for each of said elements, the first indicating means for an element being activated when the associated element is to be operated;

first cyclic means for sequentially applying pulses of a first polarity to said indicating means;

a second indicating means and a gating means at said remote station for each of said elements;

second cyclic means for sequentially applying pulses of said first polarity to said gating means and for applying pulses of the other polarity to said second indicating means, the pulse of said first polarity being applied to each gating means being immediately followed by the pulse of said second polarity which is applied to the corresponding second indicating means, said first and second cyclic means being synchronized with each other;

means responsive to a first indicating means being activated when a pulse of said first polarity is applied to it for passing said pulse of said first polarity to condition all of said gating means at said remote station;

means responsive to a gating means being conditioned when a pulse of said first polarity is applied to it for operating the associated element and for activating the associated second indicating means;

means responsive to a second indicating means being activated when a pulse of said other polarity is applied to it for passing said pulse of the other polarity to said central station; and means responsive to the pulse of said other polarity being received at said central station for indicating that said element has been operated.

7. A system of the type described in claim 6 including:

a single two-wire transmission line in interconnecting said central and remote stations wherein the pulses of said first polarity applied to said remote station and the pulses of said other polarity applied to said central station are both applied through said transmission line.

8. A system for operating elements at a remote station from a central station and for receiving back an indication at the central station that the elements have been operated, comprising:

means for generating bi-polar pulses at the central station;

means for generating like bi-polar pulses at the remote station, said pulses at said central station and said remote station being time related to each other;

means at said central station for indicating that an element at the remote station is to be operated;

means responsive to said indicating means for permitting the first half of a bi-polar pulse at said central station to be applied to the remote station;

means responsive to said half bi-polar pulse from said central station for permitting the corresponding half bi-polar pulse at said remote station to operate said element;

means responsive to the operating of said element for permitting the second half of a bi-polar pulse at said remote station to be applied to said central station; and means responsive to said second half bi-polar pulse from said remote station for permitting the corresponding second half bi-polar pulse at said central station to be applied to give an indication at the central station of the operating of the remote element.

9. A system for operating elements at a remote station from a central station and for receiving an answer-back signal at the central station each time an element is successfully operated comprising:

first indicating means at said central station for each of said elements, the first indicating means for an element being activated when the associated element is to be operated;

a rotating magnetic member at said central station;

rotating means for generating a magnetic field at said remote station;

means responsive to said rotating means reaching a particular point in its rotating cycle for causing a synchronizing magnetic spot to be recorded on said magnetic member at said central station;

means responsive to said synchronizing magnetic spot for sequentially applying pulses of a first polarity to said indicating means;

a second indicating means and a gating means at said remote station for each of said elements;

means responsive to said rotating means for sequentially applying pulses of said first polarity to said gating means and for applying pulses of the other polarity to said second indicating means, the pulses of said first polarity being applied to each gating means immediately followed by the pulse of said second polarity which is applied to the corresponding second indicating means;

means responsive to a first indicating means being activated when a pulse of said first polarity is applied to it for passing said pulse of said first polarity to condition all of said gating means at said remote station;

means responsive to a gating means being conditioned when a pulse of said first polarity is applied to it for operating the associated element and for activating the associated second indicating means; and means, including in part said synchronizing spot recording means, responsive to a second indicating means being activated when a pulse of said other polarity is applied to it for causing a spot to be recorded on said magnetic member at said central station.

10. A system of the type described in claim 9 including a single two-wire transmission line interconnecting the central and remote stations wherein the pulses of said first polarity applied to said remote station and the pulses of said second polarity applied to said central station are both applied through said transmission line.

11. A system for operating elements at a remote station from a central station and for receiving an answer-back signal at the central station each time an element is successfully operated comprising:

first indicating means at said central station for each of said elements, the first indicating means for an element being activated when the associated element is to be operated;

a rotating magnetic member at said central station;

rotating means for generating a magnetic field at said remote station;

two synchronizing coils at said remote station and a read coil for each element to be oeprated, said coils being positioned to have a bi-polar pulse induced in them as they are passed in sequence by said rotating means, the spacing between said synchronizing coils being different from that between the other of said coils;

means responsive to half of the bi-polar pulse generated in each of said synchronizing coils for causing a first and a second synchronizing magnetic spot to be recorded on said magnetic member at said central station;

a read coil at said central station for each of said elements to be energized, said coils being positioned to have a bi-polar pulse induced in them when a magnetic spot on said magnetic disc at said central station passes them;

means for applying the first half of the bi-polar pulse induced in each of the coils at said central station as said first synchronizing magnetic spot passes it to the corresponding first indicating means;

a second indicating means and a gating means at said remote station for each of said elements;

means for applying the first half of the bi-polar pulse induced in each coil at said remote station as the rotating means passes it to the corresponding gating means and for applying the second half of the bi-polar pulse induced in each of said coils to the corresponding second indicating means;

means responsive to a first indicating means being activated when a pulse is applied to it for passing said pulse to condition all of the gating means at said remote station;

means responsive to a gating means being conditioned when the first half of a bi-polar pulse from the corresponding coil at the remote station is applied to it for operating the associated element and for activating the associated second indicating means;

means, including in part said synchronizing spot recording means, responsive to a second indicating means being activated when the second half of a bi-polar pulse from the corresponding coil at the remote station is applied to it for causing a spot to be recorded on the magnetic member at the central station;

a pair of synchronizing coils at said central station, said coils being spaced by a distance equal to the distance between the two synchronizing coils at said remote station; and means, including in part said read coils at the central station, responsive to said first and second synchronizing spots being adjacent to said synchronizing coils for causing an indication to be generated as to which elements have been operated.

References Cited

UNITED STATES PATENTS

| | | | |
|---|---|---|---|
| 2,946,986 | 7/1960 | Harrison | 340—164 X |
| 2,978,676 | 4/1961 | Spencer | 340—163 X |
| 3,122,723 | 2/1964 | Coley et al. | 340—163 |
| 3,146,456 | 8/1964 | Silliman et al. | 340—163 |
| 3,215,778 | 11/1965 | Abramson | 340—364 X |

JOHN W. CALDWELL, *Primary Examiner.*

H. I. PITTS, *Assistant Examiner.*

U.S. Cl. X.R.

340—164, 151